United States Patent
Man

(10) Patent No.: US 6,219,827 B1
(45) Date of Patent: *Apr. 17, 2001

(54) TRACE RANKING IN A DYNAMIC TRANSLATION SYSTEM

(75) Inventor: Richard F. Man, Palo Alto, CA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,350

(22) Filed: Mar. 12, 1998

(51) Int. Cl.$^7$ .................................................. G06F 9/45

(52) U.S. Cl. .............................. 717/4; 711/133; 711/134; 711/135; 711/136

(58) Field of Search ............................... 395/704; 717/4; 711/133–136; 714/34–35

(56) References Cited

U.S. PATENT DOCUMENTS

| | | | | |
|---|---|---|---|---|
| 5,305,389 | * | 4/1994 | Palmer ........................ | 382/1 |
| 5,668,987 | * | 9/1997 | Schneider ..................... | 395/603 |
| 5,822,759 | * | 10/1998 | Treynor ........................ | 711/134 |
| 5,894,575 | * | 4/1999 | Levine et al. ................. | 395/704 |
| 5,943,687 | * | 8/1999 | Liedberg ...................... | 711/156 |
| 6,041,406 | * | 3/2000 | Mann ........................... | 712/227 |

OTHER PUBLICATIONS

Chen et al. Performance of Shared Cache on Multithreaded Architectures. IEEE. pp. 541–548, 1996.*

Shahrier et al. On Predictability and Optimization of Multiprogrammed Caches for Real–time Applications. IEEE, 1997.*

Nobue. Method and Device For Firmware Tracing. Patent Abstracts of Japan, Unexamined Applications, Section: P, Sect. No. 1439, Vol. 16, No. 5, P. 19, Oct. 1992.*

* cited by examiner

Primary Examiner—Kakali Chaki
Assistant Examiner—Wei Zhen

(57) ABSTRACT

A method and system of trace ranking that applies artificial life principles to determine a predictively accurate ranking for cache retention or discard of traces. In a preferred embodiment, the ranking system is based upon biological modeling of ant trails. The system can enable a trace ranking policy where valuable traces can be identified to be kept in the cache as much as possible, while less valuable traces can be marked to discard. The system is further dynamic over time, whereby ranking emphasis changes in accordance with the dynamic behavior of the program. According to a preferred embodiment of the inventive trace ranking system, and analogous to the ant trail model, each trace contains counting code so that each time it is executed it increments a ranking counter by one. At predetermined intervals a dissipation factor is applied uniformly to reduce the value of all counters. By tuning the period between successive dissipation adjustments, and by tuning to a function the amount that the counters are reduced at selected dissipation operations, ranking becomes tunably predictive of the dynamic behavior of the program, analogous to the way in which the strength of a pheromone trail is predictive of the route followed by a foraging ant.

34 Claims, 2 Drawing Sheets

| TIME INTERVAL | TRACE 1 | TRACE 2 | TRACE 3 | TRACE 4 |
|---|---|---|---|---|
| 1 | 1000 $R_1$ | 5 $R_2$ | 0 | 0 |
| 2 | 2000 $R_1$ | 10 $R_2$ | 0 | 0 |
| 3 | 2010 $R_1$ | 1015 $R_2$ | 0 | 0 |
| DISSIPATE D(SYSTEM) = 1000 | 1010 $R_1$ | 15 $R_2$ | 0 | 0 |
| 4 | 1010 $R_2$ | 1025 $R_1$ | 0 | 0 |
| 5 | 1010 $R_2$ | 2025 $R_1$ | 0 | 0 |
| 6 | 1010 $R_2$ | 3025 $R_1$ | 75 $R_3$ | 0 |
| DISSIPATE D(SYSTEM) = 1000 | 10 $R_2$ | 2025 $R_1$ | 0 $R_3$ | 0 |
| 7 | 10 $R_3$ | 2035 $R_1$ | 1000 $R_2$ | 0 |

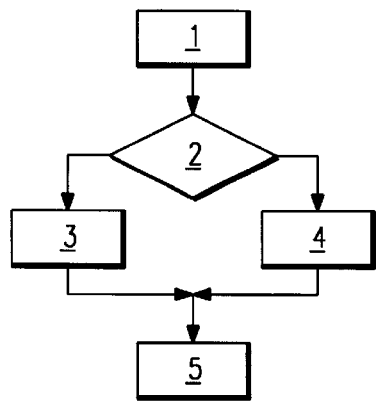

FIG. 1

240
```
<OPERATION 1>
<OPERATION 2>
IF <CONDITION = = TRUE>
       <EXIT TRACE>
<OPERATION 4>
<OPERATION 5>
<OPERATION 7>
<OPERATION 8>
```

FIG. 2C

201
```
<OPERATION 1>    202
<OPERATION 2>
IF <CONDITION = = TRUE>
       <OPERATION 3>
ELSE
       <OPERATION 4>
<OPERATION 5>    203
IF <CONDITION = = TRUE>
       <OPERATION 6>
ELSE
       <OPERATION 7>
<OPERATION 8>
```

FIG. 2A

```
COUNT_ENTRY:
       LDW  (GR18),GR17
       LDO  1(GR17),GR17
       STW  GR17,(GR18)
NOCOUNT_ENTRY:
<BODY OF ACTUAL TRACE>
```

FIG. 3A

220
```
<OPERATION 1>
<OPERATION 2>
IF <CONDITION = = FALSE>
       <EXIT TRACE>
<OPERATION 3>
<OPERATION 5>
<OPERATION 6>
<OPERATION 8>
```

FIG. 2B

```
COUNT_ENTRY:
       B    NOCOUNT_ENTRY
       LDW  (GR18),GR17
       LDO  1(GR17),GR17
       STW  GR17,(GR18)
NOCOUNT_ENTRY:
<BODY OF ACTUAL TRACE>
```

FIG. 3B

```
STRUCT ITIMERVAL DISSIPATION_TIMER = 0;
DISSIPATION_TIMER.IT_VALUE.TV_USEC = I(SYSTEM);
DISSIPATION_TIMER.IT_INTERVAL_USEC = I(SYSTEM);
SETITIMER(ITIMER_VIRTUAL, &DISSIPATION_TIMER, NULL);
```

*FIG. 4A*

```
DISSIPATION_FUNCTION:
        <FOR ALL TRACES IN CODE CACHE>
R(TRACE) = R(TRACE) - D(SYSTEM);
IF (R(TRACE)<0 && P(SYSTEM) = = FALSE)
        R(TRACE) = 0;
```

*FIG. 4B*

| TIME INTERVAL | TRACE 1 | TRACE 2 | TRACE 3 | TRACE 4 |
|---|---|---|---|---|
| 1 | 1000 $R_1$ | 5 $R_2$ | 0 | 0 |
| 2 | 2000 $R_1$ | 10 $R_2$ | 0 | 0 |
| 3 | 2010 $R_1$ | 1015 $R_2$ | 0 | 0 |
| DISSIPATE D(SYSTEM) = 1000 | 1010 $R_1$ | 15 $R_2$ | 0 | 0 |
| 4 | 1010 $R_2$ | 1025 $R_1$ | 0 | 0 |
| 5 | 1010 $R_2$ | 2025 $R_1$ | 0 | 0 |
| 6 | 1010 $R_2$ | 3025 $R_1$ | 75 $R_3$ | 0 |
| DISSIPATE D(SYSTEM) = 1000 | 10 $R_2$ | 2025 $R_1$ | 0 $R_3$ | 0 |
| 7 | 10 $R_3$ | 2035 $R_1$ | 1000 $R_2$ | 0 |

*FIG. 5*

TRACE RANKING IN A DYNAMIC TRANSLATION SYSTEM

BACKGROUND OF THE INVENTION

Dynamic translation systems are a relatively new field of endeavor in the computer and software art. A technique used in dynamic translation systems is the analysis of traces.

A trace is a sequence of "blocks" or "basic blocks" of machine code. A block, or basic block, is a sequence of non-branching machine instructions ending with an exit to another block. The exit instruction may be a branch, or a conditional branch, or a fall-through to the next basic block. A program consists of multiple blocks.

During program execution, a program executes a series of basic blocks in paths. A trace records the path followed in the series. For example, with reference to FIG. 1, a program fragment is illustrated in which the programs may execute along different paths. In FIG. 1, the program may execute either block 3 or block 4, depending on a conditional test in block 2. Two possible traces included in the fragment illustrated in FIG. 1 are blocks "1-2-3-5" or blocks "1-2-4-5."

A dynamic translation system monitors the execution of an application to identify the traces that the application executes, and then translates those traces into more effective code.

Of course, the dynamic translation techniques as described must take place in an environment of a computer architecture and data structure of a fixed size. Cache memory is always advantageous to expedite processing, but in a fixed environment, cache devoted to storing traces must be managed as yet another limited and potentially scarce resource.

The preferred embodiment of the invention described herein is implemented using software cache (or "code cache") rather than hardware cache. It will be appreciated that a code cache is simply a section of memory allocated to the job of being a cache, and is typically bigger than a machine cache. However, for performance reasons, a code cache must still be limited in size and therefore managed like any other resource.

The code cache may be limited by the amount of physical memory in the system, or by the amount of hardware cache available. If a code cache is large compared to the physical memory, the system performance is likely to suffer since less memory would be available to run other applications. Depending on the system, for example, if the hardware cache is small and access to physical memory is slow, the code cache should not be too much larger than the hardware cache either.

Traces stored in cache will ideally execute faster than traces that are stored in main memory. Selection of the traces to store in cache as the program executes may be according to any of numerous memory protocols specific to various architectures and operating systems. Once placed in cache, however, a cache retention and discard protocol becomes highly advantageous in order to make room for new traces to be stored in the cache as program execution continues.

Ideally, traces will be retained in cache memory according to their retention value to the execution of the program. When the program executes a trace frequently, it is advantageous to keep it in cache memory. A trace executed infrequently need not be retained in cache, and in fact should be discarded to make room for incoming traces that may potentially be used more frequently.

Various methods are known in the art for selecting items to be retained in cache and items to be discarded. One fairly common method is simply to empty the entire cache when it is full and then start over. Although easy to implement, this method ignores the value of frequently-used items. After emptying the cache, processing must repopulate the cache with these items even though they were already in cache perhaps only moments before. This method is therefore like "throwing out the baby with the bath water."

A better system would rank items stored in cache to determine which ones to keep and which ones to discard.

Ranking is used with advantage in other related fields of endeavor. For example, Operating System (OS) kernels must decide which virtual pages to keep in physical memory, and which to throw out. It is known to rank virtual pages for this purpose, typically on a "Most Recently Used" (MRU) basis. Whenever there is an access to an address in a particular virtual page, that page's rank is promoted to the top. Frequently-accessed pages thus stay near the top, and lesser-accessed ones fall to the bottom. The top of the list is generally kept in physical memory.

A related ranking system uses a "Least Recently Used" (LRU) system, where the time between accesses is monitored and forms the basis for a ranking. Those items used less frequently (i.e. time between accesses is high) get a lower rank. Although perhaps more accurately predictive, the LRU method is less favored over the MRU method because it requires a higher processing overhead to maintain.

A further ranking system known in the art simply counts the number of times an item is used. The higher the number, the higher the rank.

All of the foregoing methods of ranking are inappropriate for cache memory management in dynamic translation systems. By its nature, the behavior of dynamic translation systems may change over time. In particular, traces may vary in size, or go "dormant" for a period before becoming very active again. The "empty out and start over" method is just too inherently inefficient to account for this dynamic behavior. It simply has no mechanism to determine what is important and what is not. The MRU, LRU and "counting" methods are too inflexible to account for this dynamic behavior. For example, assume a trace in a dynamic system executes very frequently in "bursts." An MRU or LRU algorithm may assign a low rank to a trace when the trace is in its dormant phase, even though it is shortly to become "hot." A "counting" method may assign a false high ranking to a trace that is "hot" at the time but shortly never (or rarely) execute again.

There is therefore a need in the dynamic translation systems art for a trace ranking system which, via accurate predictive ranking, enables cache management to determine which traces to keep in cache and which to discard.

SUMMARY OF THE INVENTION

These and other objects, features and technical advantages are achieved by a method and system of trace ranking that applies artificial life principles to determine a predictively accurate ranking for cache retention or discard of traces. In a preferred embodiment, the ranking system is based upon biological modeling of ant trails. The system can enable a trace ranking policy where valuable traces can be identified to be kept in the cache as much as possible, while less valuable traces can be marked to discard. The system is further dynamic over time, whereby ranking emphasis changes in accordance with the dynamic behavior of the program.

Although other artificial life principles may be applicable to trace ranking, a preferred embodiment applies the behavior of ants in forming and strengthening food source trails to develop the inventive trace ranking system. Ants carrying food leave a strong pheromone trail. If an ant encounters a trail that has a strong pheromone signature, it will follow the trail to the food source. The pheromone chemical nonetheless dissipates into the air over time, and so if the pheromone trail is not reinforced by a succession of ants carrying food, it will weaken and make it less likely to be followed by a later ant.

According to a preferred embodiment of the inventive trace ranking system, and analogous to the ant trail model, each trace contains counting code so that each time it is executed it increments a ranking counter by one. At predetermined intervals a dissipation factor is applied uniformly to reduce the value of all counters. By tuning the period between successive dissipation adjustments, and by tuning to a function the amount that the counters are reduced at selected dissipation operations, ranking becomes tunably predictive of the dynamic behavior of the program, analogous to the way in which the strength of a pheromone trail is predictive of the route followed by a foraging ant. Of course, the dissipation of a pheromone chemical into the atmosphere is an analog mechanism (continuous), whereas a computer must simulate this dissipation in discrete digital steps spaced far enough apart not to generate an unacceptable processing overhead.

It is therefore a technical advantage of the present invention to borrow from artificial life principles to establish a mechanism for ranking traces in dynamic translation system.

It is a further technical advantage of the present invention to use biological modelling of ant trails to establish said mechanism. Each trace is provided with counting code that increments each time the trace executes. This corresponds in the model to an ant following a particular pheromone trail to a food source and, in doing so, reinforcing the strength of the trail's pheromone signature by virtue of its own passage along the trail at that time. The present invention then periodically reduces the values in all traces' counting code, corresponding to the dissipation of ants' pheromone trails into the atmosphere. The frequency and amount by which the traces' counting code is reduced may be preselected to be according to different functions. The rank of traces that are used frequently thus "stay strong," while those that are used infrequently "dry up," similar to the behavior of the pheromone signature on ant trails.

It is a further technical advantage of the present invention to use tunable parameters within an algorithm to define the frequency and amount that traces' counting code is reduced. In this way, the mechanism can be tuned to be accurately predictive of the cache retention requirements to give optimal performance of the dynamic translation system in which the traces are found.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 depicts an exemplary sequence of basic blocks creating two possible traces;

FIG. 2A depicts an exemplary application code fragment;

FIG. 2B depicts a first trace generated by execution of the code fragment depicted in FIG. 2A;

FIG. 2C depicts a second trace generated by execution of the code fragment depicted in FIG. 2A;

FIG. 3A depicts PA-RISC counting instructions when dynamic translation can accommodate more than one trace entry point;

FIG. 3B depicts PA-RISC counting instructions when dynamic translation can accommodate only one trace entry point;

FIG. 4A depicts pseudo code for generating a dissipation timer signal;

FIG. 4B depicts pseudo code for applying dissipation; and

FIG. 5 is a table illustrating operation of the inventive trace ranking mechanism.

DETAILED DESCRIPTION OF THE INVENTION

A preferred embodiment of the present invention is described with reference to exemplary application code fragments expressed as pseudo code. It will be appreciated, however, that the inventive trace ranking system is not limited to any particular application or programming language. In fact, the inventive trace ranking system will be seen to be universal to dynamic translation systems regardless of how implemented or expressed.

The Advantage of Trace Ranking

With reference to FIG. 2A, an exemplary application code fragment 201 is illustrated with two conditional operations 202 and 203. Let it be assumed that in a first execution of fragment 201, <condition> in conditional statements 202 and 203 is true. Note also that to make this assumption, it must also be assumed that <operation 3> and <operation 5> do not change <condition> from being true. Based on this assumption, the execution of fragment 201 generates trace 220 as illustrated in FIG. 2B. So long as <condition> remains true, trace 220 may advantageously be stored in code cache and executed instead of fragment 201. It will be further appreciated that trace 220 as shown on FIG. 2B has translated fragment 201 so that only one check of <condition> is necessary.

Dynamic translation may further optimize <operations 1-2-3-5-6-8> together as represented in trace 220. For example, suppose (on FIG. 2A)

<operation 1> is variable=1:

<operation 2> is variable=3: and

<operation 5> is [ . . . ]=variable: "Variable" will be either 1 or 3 in <operation 5> depending on whether or not <operation 4> executes. When <condition> is true as for trace 220 on FIG. 2B, <operation 4> does not execute and so <operation 5> in trace 220 can be translated to:

[ . . . ]=1

Now let it be assumed that in a later execution of fragment 201 on FIG. 2A, <condition> is false. The execution of fragment 201 generates trace 240 as illustrated on FIG. 2C. Again, so long as <condition> remains false, trace 240 may be stored in code cache and executed instead of fragment 201.

Dynamic translation may further optimize <operations 1-2-4-5-7-8> when, using the examples above, it is now known that <operation 4> will execute in trace 240. Now, <operation 5> in trace 240 can be translated to:

[ . . . ]=3

The advantage of dynamic translation manifests itself here. Rewriting <operation 5> in the above examples will be recognized to be a compiler technique known in the art as "constant value propagation." However, a standard compiler optimizing fragment 201 on FIG. 2A would not generally make such an optimization since it would not be known whether <condition> is true or false. Under dynamic translation, however, the optimization has been based on generation of traces 220 and 240. Dynamic translation then observes the behavior of the program through monitoring the execution of traces 220 and 240. The likelihood of whether <condition> is true or false is determined and the corresponding trace is executed.

The further advantage of trace ranking now manifests itself, when it is appreciated that both traces 220 and 240 may potentially be stored in code cache at the same time. The likelihood of which trace gets executed may change over time. If code cache management needs to discard a trace, it will want to throw out the trace least likely to be used into the foreseeable future.

A trace ranking system according to the present invention thus helps code cache management decide which traces to save, and which to discard.

Trace Ranking According to the Invention

As noted above in the Summary section, the invention ranks traces, and then adjusts the ranking according to artificial life principles derived from the behavior of ants refreshing pheronome trails when foraging for food.

Each trace is given a rank value of R with a higher R value meaning higher in rank. A trace starts with a pre-selected initial rank value of R(system). In a preferred embodiment, the traces are prefixed by a sequence of instructions C that increments R each time the trace is executed. It will be appreciated, however, that the instructions C may also articulate a function that increments R according to current values of selected variables, which variables may further include, if desired, a variable incremented by one each time the trace is executed.

At a selected interval of I time period, rank values R of selected traces are then decremented by a dissipation factor of D amount. Again, in a preferred embodiment, all traces' rank values R are decremented by D, although it will be appreciated that other equivalent embodiments may decrement selected traces' rank values R according to a function of D. It will also be appreciated that, consistent with the present invention, D itself may be a constant, or alternatively the result of yet another function. When decrementing by D, if D is greater than a trace's R, a global parameter P also advantageously controls whether a rank value is allowed to go to a negative level or stays at zero. It will be further appreciated that the values of R, I, D and P may change as the program executes to achieve more accurate ranking.

Exemplary pseudo code for the inventive trace ranking will now be discussed. Trace ranks have to be initialized at some point prior to executing the program from which they are generated. This is advantageously done with a simple instruction R(trace)=R(system)

The value of R(system) is normally zero, although there is no reason why, consistent with the present invention, R(system) may not be set to some other predetermined initial value.

Incrementing R(trace) can be as simple as executing the instruction

R(trace)=R(trace)+1 each time a trace executes. To that end, incrementing instructions are advantageously attached to the beginning of a trace. As noted above, although a preferred embodiment increments by 1, there is no reason why, consistent with the invention, R(trace) may not be incremented by the value of any selected or derived variable.

Optionally, it may be desired not to rank a particular trace during a particular period of time. Accordingly, it is advantageous to include the instruction,

IF (<COUNTING>==TRUE)

before the incrementation command in the code attached to the beginning of the trace. In this way, the condition of <COUNTING> will determine whether the trace rank incrementation will execute (i.e. <COUNTING> is true), or whether trace rank incrementation will be skipped to conserve processing resources (i.e. <COUNTING> is false). This feature of optionally skipping trace rank incrementation instructions can be further enhanced depending on whether the dynamic translation system can accommodate different entry points for a trace according to whether rank incrementation is done or not. If different entry points can be accommodated, then the trace may be represented in the PA-RISC programming language as shown on FIG. 3A. It will be seen on FIG. 3A that input register GR18 set up to contain the incremented rank of the trace, and GR17 is used as a scratch register. Depending on whether this trace is being ranked or not, the entry point for the trace is either "count_entry" or "nocount_entry."

Alternatively, if the dynamic translation system is not able to locate separate entry points, then the trace may be represented (again in the PA-RISC programming language) as shown on FIG. 3B. In FIG. 3B, the entry point is always "count entry." The code in FIG. 3B is written so that rank incrementation will not occur and the counting instructions will be skipped. This enabled by the branch instruction "B nocount_entry." To make FIG. 3B increment trace ranks, the branch instruction is simply rewritten as an NOP instruction.

According to the present invention, a dissipation factor is applied to selected (and advantageously all) values of R(trace) at selected intervals. While a preferred embodiment assumes dissipation is applied uniformly to all trace rankings at the same time, there is no reason why, consistent with the present invention, dissipation may be applied at varying time intervals to selected trace rankings. The varying time intervals could advantageously be selected according to the prevailing outcome of a time-based function.

With reference to FIGS. 4 and 4B, a timer advantageously propagates the dissipation function by setting predetermined values in the variable I(system). For example, FIG. 4A depicts exemplary pseudo code for use to dispose the HP-UX operating system to set a timer according to a value of I(system). Pursuant to FIG. 4A, the operating system will send a timer signal to the dynamic translation process every I(system) microseconds. Experience has demonstrated that setting a short time interval for I(system) is advantageous. For example, for the HP-UX operating system, the smallest timer interval is currently 1 ms. During this time interval, a state of the art 200 MHz processor will execute an average of 200,000 instructions, with a reachable maximum of 800,000. It is therefore clearly advantageous to select a small value for I(system) to enable some degree of resolution in tuning the frequency of dissipation operations.

Upon receiving a timer signal, the dynamic translation processor calls up the dissipation function. Exemplary pseudo code for this call-up is shown in FIG. 4B.

It will be appreciated that the value of D(system) can be selected and tuned for a wide spectrum of dissipation amounts. It may be a constant, or the result of a function of some other variables. D(system) can also be tuned dynamically by the system itself. For example, by initially setting D(system) as a high value, the value of R(trace) is likely to be zero after each dissipation operation. Meanwhile, before applying the dissipation operations, the system records the average value of R(trace), as well as the high and low values. After several iterations, D(system) may be reset based on the data collected, for example:

D(system)=highest−factor or

D(system)=average+factor or other functions based on the data collected.

It will be further seen on FIG. 4B that the condition of a parameter P(system) is advantageously checked to see if the current implementation of the trace ranking mechanism allows R(trace) to go negative. While there is no limitation within the inventive mechanism on any value of R(trace), positive or negative, it will be recalled that the preferred embodiment ranks traces by analogy to the biological model of foraging ants following pheronome trails. Clearly, the pheronome strength of an ant trail cannot go negative. Accordingly, an option is built in to prevent R(trace) from going negative so that the biological model remains as applicable as possible.

FIG. 5 illustrates the operation of the inventive mechanism in tabular format. The numeric values for traces in FIG. 1 are counts of executions of the trace in the time interval. In time intervals 1 and 2, trace 1 is active, trace 2 is "waking up," while traces 3 and 4 are dormant. Due to dynamic behavior of the program, trace 1 goes dormant after time interval 2, and will stay dormant for the rest of the program. Meanwhile, trace 2 becomes active and remains active through time interval 6, whereupon it goes dormant. Trace 3 starts to "wake up" in time interval 6, and is active in time interval 7. Trace 4 remains dormant throughout.

With further reference to FIG. 5, a dissipation of 1000 counts is applied every 3 time intervals. This causes the trace ranking to vary as shown in the bottom right corner of each trace's count value for each time interval.

The advantage of the dissipation operation may thus be seen. Without dissipation, the count value for trace 1 would have stayed at 2010 for the rest of the program. This would give trace 1 an artificially high trace ranking long after it had gone dormant and also while trace 3 was waking up. Cache management looking at trace rankings after interval 7, for example, might therefore keep trace 1 and discard trace 3, since trace 1 would have a count of 2010 (rank=2) and trace 3 would have a count of 1075 (rank=3). Of course, this would be a poor decision in view of trace 3 becoming active and trace 1 no longer needed.

With the dissipation factors applied per FIG. 5, however, cache management sees that after time interval 7, trace 1 has an adjusted count of 10 (rank=3), while trace 3 has an adjusted count of 1000 (rank=2). Cache management would then be disposed to discard trace 1 because of its low rank.

This functionality will be seen to be reflective of the biological model of ants following pheronome trails to find food. A trail leading to food corresponding to trace 1 dried up after only 2 time intervals. Without pheronome dissipation, foraging ants would have nonetheless followed the trail and found no food. Further, the pheronome strength on the "dead" trail without dissipation would have distracted ants from the real next food-bearing trail (corresponding to trace 3). With dissipation, however, the trail corresponding to trace 1 goes "cold" quickly, allowing ants to find food more efficiently via early identification of the trail corresponding to trace 3.

Although the present invention and its advantages have been described in detail, it should be understood that various changes, substitutions and alterations can be made herein without departing from the spirit and scope of the invention as defined by the appended claims.

I claim:

1. A method for ranking traces generated during execution of a software program, said execution monitored by a dynamic translation system, the traces stored in a cache and disposed to be periodically discarded therefrom based on said ranking, the method comprising the steps of:
   (a) initially assigning an preselected initial rank value to each of a plurality of traces;
   (b) each time one of the traces executes, increasing the rank value thereof; and
   (c) periodically reducing the rank value of selected traces by a dissipation factor;
   wherein the dissipation factor is the current value of a variable.

2. The method of claim 1, in which said selected traces in step (c) are the entire plurality thereof.

3. The method of claim 1, in which step (c) is performed at regular predetermined intervals.

4. The method of claim 1, in which step (c) is performed at variable intervals, each interval selected according to the prevailing outcome of a predetermined time-based function.

5. The method of claim 1, in which the initial trace ranking is zero for all traces in the plurality thereof.

6. The method of claim 1, in which the initial trace ranking is zero for selected traces in the plurality thereof.

7. The method of claim 1, in which the rank value is increased in step (b) by one.

8. The method of claim 1, in which the rank value is increased in step (b) by the current value of a variable.

9. The method of claim 1, further comprising the step of:
   (d) following step (c), resetting trace values in a predetermined state to a preselected reset value.

10. The method of claim 9, in which the predetermine state is "having a value less than zero," and in which the preselected reset value is zero.

11. The method of claim 1, further comprising the step of:
    (d) periodically adjusting the dissipation factor according to a function of selected current trace values.

12. The method of claim 11, in which the function in step (d) includes the mean of said selected current trace values.

13. The method of claim 11, in which the function in step (d) includes the highest of said selected current trace values.

14. A method for ranking traces generated during execution of a software program, said execution monitored by a dynamic translation system, the traces stored in a cache and disposed to be periodically discarded therefrom based on said ranking, the method comprising the steps of:
    (a) initially assigning an preselected initial rank value of zero to each of a plurality of traces;
    (b) each time one of the traces executes, increasing the rank value thereof by one;
    (c) periodically, at regular predetermined intervals, reducing the rank value of all traces by a dissipation factor; and
    (d) resetting to zero those rank values having a value less than zero following step (c);
    wherein the dissipation factor is the current value of a variable.

15. The method of claim 14, further comprising the step of:

(e) periodically adjusting the dissipation factor according to a function of selected current trace values.

16. The method of claim 15, in which the function in step (e) includes the mean of said selected current trace values.

17. The method of claim 15, in which the function in step (e) includes the highest of said selected current trace values.

18. A computer program product including computer readable logic recorded thereon for enabling a computer to rank traces generated during execution of software undergoing dynamic translation, the computer having a processor and memory including cache, the traces stored in the cache and disposed to be periodically discarded therefrom based on said ranking, the computer program product comprising:

a computer-readable storage medium; and a computer program stored on the computer-readable storage medium, the computer program comprising:
means for initially assigning a preselected initial rank value to each of a plurality of traces;
means, responsive to execution of a trace in the plurality, for increasing the corresponding rank value of said executed trace;
means for periodically reducing the rank value of selected traces by a dissipation factor, wherein the dissipation factor is the current value of a variable; and
means for periodically adjusting the dissipation factor according to a function of selected current rank values.

19. The computer program product of claim 18, in which said trace value function includes at least one value selected from the group consisting of:

(a) the mean of said selected current trace values; and (b) the highest of said selected current trace values.

20. The computer program product of claim 18, further comprising:

means, responsive to the means for periodically reducing, for resetting trace values in a predetermined state to a preselected reset value.

21. The computer program product of claim 20, in which the predetermine state is "having a value less than zero," and in which the preselected reset value is zero.

22. The computer program product of claim 18, in which the means for periodically reducing operates at regular predetermined intervals on all traces in the plurality thereof.

23. The computer program product of claim 18, in which the means for periodically reducing operates variable intervals, each interval selected according to the prevailing outcome of a predetermined time-based function.

24. A trace ranking system for use in a dynamic translation system, the dynamic translation system monitoring execution of a software program from which traces are generated and then stored in a cache, the trace ranking system comprising:

means for initially assigning a preselected initial rank value to each of a plurality of traces;

means, responsive to execution of a trace in the plurality, for increasing the corresponding rank value of said executed trace;

means for periodically reducing the rank value of selected traces by a dissipation factor; and means for periodically and selectively discarding traces from the cache according said discarded traces' current rank values;

wherein the dissipation factor is the current value of a variable.

25. The trace ranking system of claim 24, in which the initial trace ranking is zero for all traces in the plurality thereof.

26. The trace ranking system of claim 24, in which the initial trace ranking is zero for selected traces in the plurality thereof.

27. The trace ranking system of claim 24, in which the means for increasing increments said corresponding rank value by one.

28. The trace ranking system of claim 24, in which the means for increasing increments said corresponding rank value by the current value of a variable.

29. The trace ranking system of claim 24, further comprising:

means, responsive to the means for periodically reducing, for resetting trace values in a predetermined state to a preselected reset value.

30. The trace ranking system of claim 29, in which the predetermine state is "having a value less than zero," and in which the preselected reset value is zero.

31. The trace ranking system of claim 24, in which the means for periodically reducing operates at regular predetermined intervals on all traces in the plurality thereof.

32. The trace ranking system of claim 24, in which the means for periodically reducing operates variable intervals, each interval selected according to the prevailing outcome of a predetermined time-based function.

33. The trace ranking system of claim 24, further comprising:

means for periodically adjusting the dissipation factor according to a function of selected current trace values.

34. The trace ranking system of claim 33 in which said trace value function includes at least one value selected from the group consisting of:

(a) the mean of said selected current trace values; and (b) the highest of said selected current trace values.

* * * * *